C. D. BARRETT.
SPRING RECOIL ABSORBER FOR AUTOMOBILES.
APPLICATION FILED DEC. 11, 1919.

1,404,423.

Patented Jan. 24, 1922.
3 SHEETS—SHEET 1.

Inventor
Charles D. Barrett,
by Kerr, Page, Cooper & Hayward
Attorneys

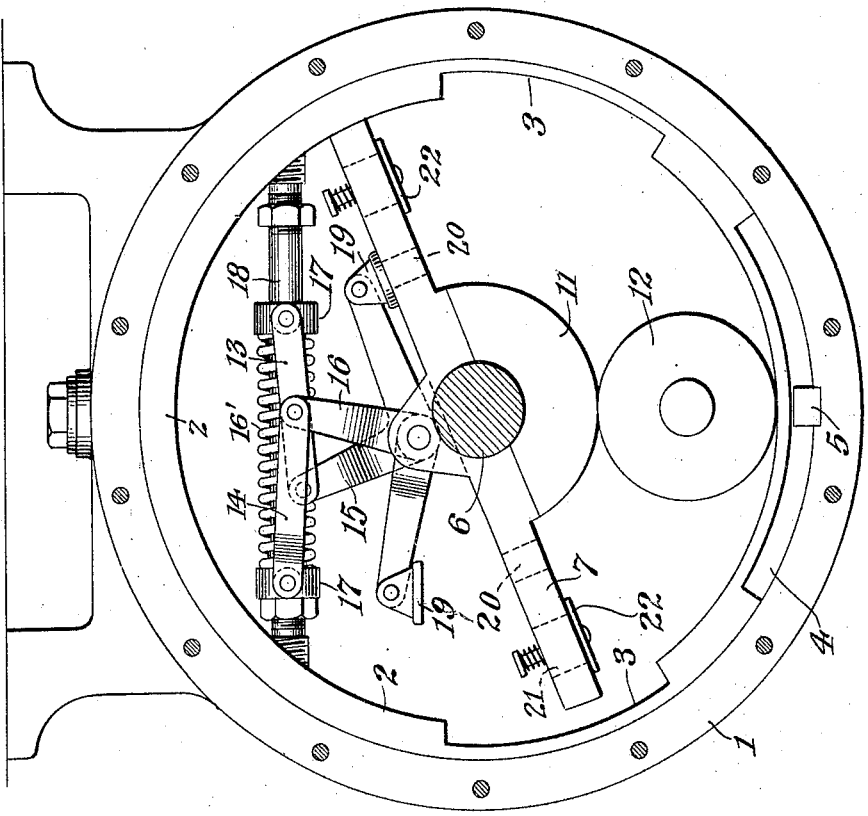
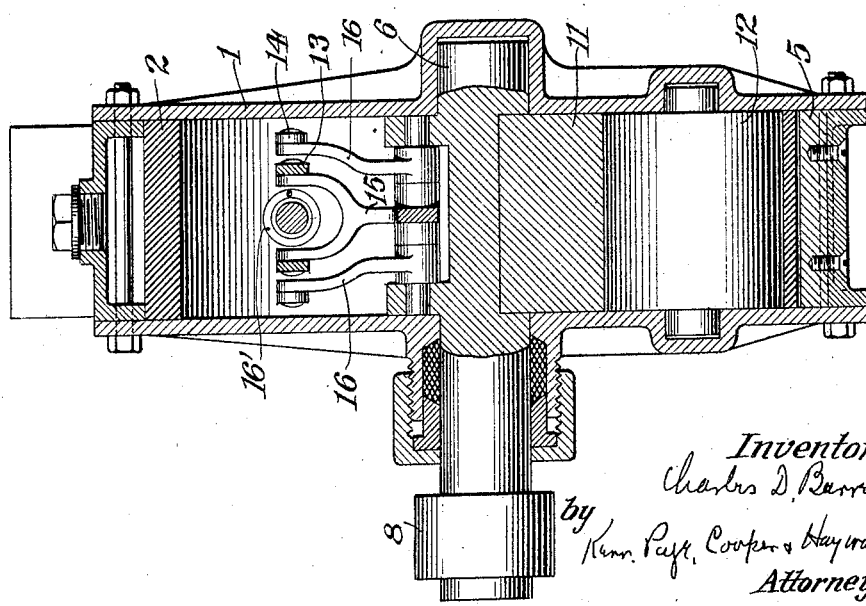

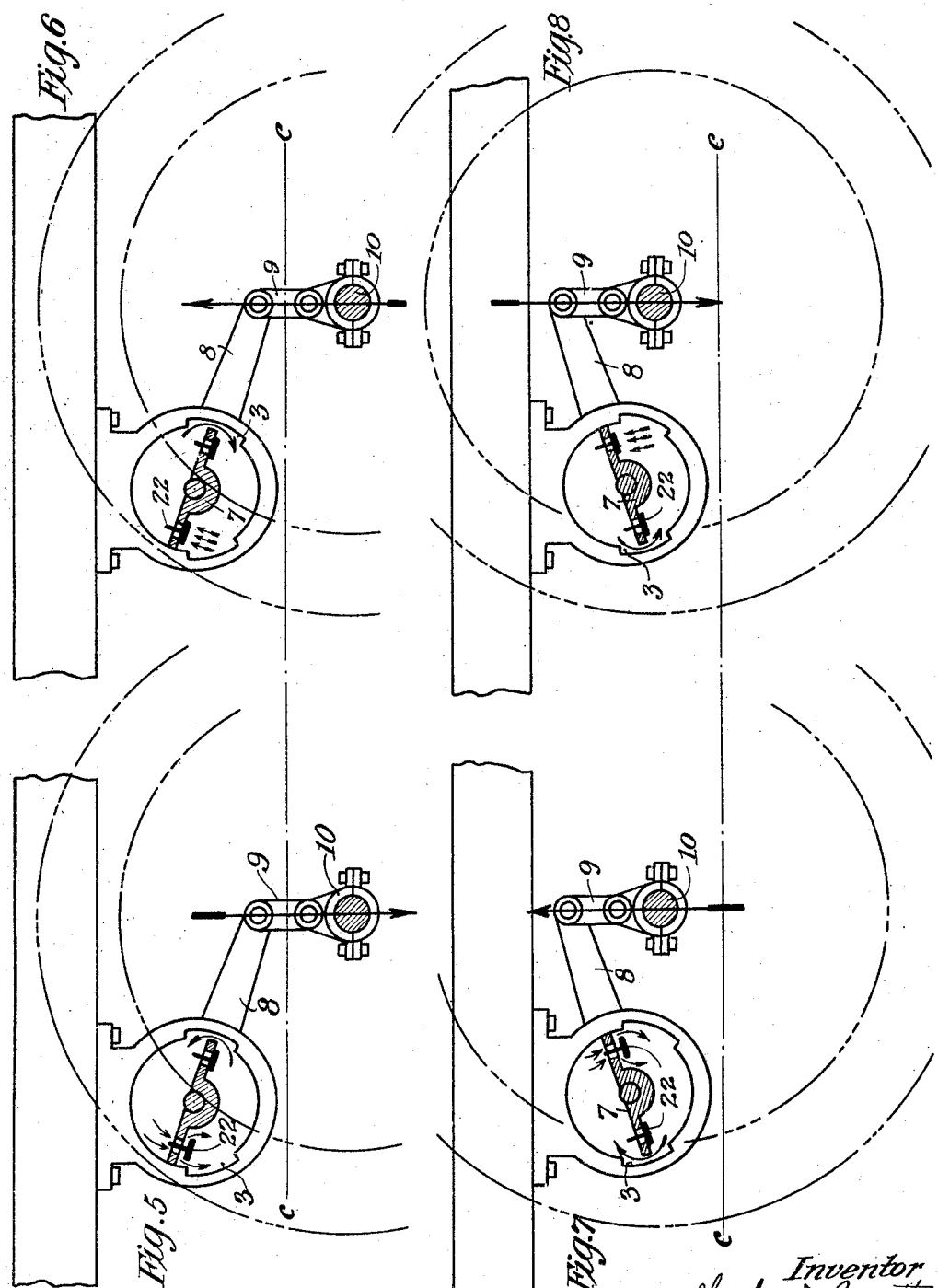

UNITED STATES PATENT OFFICE.

CHARLES D. BARRETT, OF NEW YORK, N. Y.

SPRING-RECOIL ABSORBER FOR AUTOMOBILES.

1,404,423.   Specification of Letters Patent.   Patented Jan. 24, 1922.

Application filed December 11, 1919. Serial No. 344,257.

*To all whom it may concern:*

Be it known that I, CHARLES D. BARRETT, a citizen of the United States of America, residing at New York, in the county and State of New York, have invented certain new and useful Improvements in Spring-Recoil Absorbers for Automobiles, of which the following is a full, clear, and exact description.

Any spring supported vehicle such as an automobile has the springs intermediate the car body and the wheel axles. In running over roads containing pronounced inequalities of surface of any nature, these springs if unrestricted by other means distend or compress in accordance with laws fixed by their dimensions and elasticity, thus permitting the wheels to follow the irregularities of the road surface while the body of the car moves in a smoother path.

When the vehicle is moving in a straight line on a smooth surface the compression load of each spring equals the weight of that portion of the car which it supports. The position of the spring and axle under these conditions will be called the static position and the spring will be said to be under normal compression. As the axle moves up and down the difference between the momentary compression of the spring and the normal compression is a force acting in either an upward or downward direction on the car body. This may be called the unbalanced force.

When the wheel hits a bump or obstruction on the road surface, the axle is forced upward toward the car body. The compression of the spring is greater than normal and therefore the unbalanced force on the car body is upward, and any resistance to the movement of the spring will increase the unbalanced force.

The resistance of the spring gradually stops the upward movement of the axle and then forces it to move downward away from the car body. Until the axle has moved down to its static position the unbalanced force on the car body is still upward. Any resistance to the movement of the spring at this time will result in a downward pull on the car body and therefore reduce the unbalanced force. During this movement the wheel is frequently off the ground and any resistance to the movement of the spring reduces the downward force on the wheel and axle and prevents them from attaining an excessive velocity which otherwise, when the wheel hits the ground, would frequently result in shock greater than that due to the original obstruction.

When the wheel hits a depression in the road surface the axle is forced downward away from the car body. The compression of the spring is then less than normal and the unbalanced force on the car body is downward. Resistance to the movement of the spring would result in a downward pull on the car body and increase the unbalanced force.

The axle then moves up to its static position. The compression of the spring being less than normal the unbalanced force on the car body is still downward. Resistance to the upward movement of the spring would produce an upward force on the car body and thus reduce the unbalanced force.

From the foregoing description of the action of the spring it is apparent that it is not advisable to introduce any outside resistance to the movement of the spring when the axle is moving away from its static position in either an upward or downward direction, but that it is advantageous to introduce resistance to the movement of the spring when the axle is returning to its static position from either direction.

It also appears that as the axle moves from a position either above or below its static position to a position on the other side, the action of the spring should be resisted during the first part of the movement but the resistance should be released just as the axle reaches the static position.

To resist the downward movement of the spring after it has been compressed due to the wheel hitting an obstruction in the road surface and thus prevent the excessive velocity of the wheel and axle with the consequent shock, it has been customary to use some form of shock absorber. All known devices of this character have the disadvantage that they also resist the movement of the spring when the axle is moving away from its static position. The result is that all known absorbers impair the easy riding qualities of the vehicle under some conditions of speed and road surface although they may improve the riding qualities under other conditions.

I have sought to improve upon the operation of these absorbers by providing a means which will permit the free movement of the spring whenever the axle is moving away from its static position, but which will resist the movement of the spring whenever the axle is returning to its static position. Excessive velocity of the wheel and axle is thus prevented and at the same time there is a reduction in the total unbalanced force on the car body during any given period.

The difficulty in producing a device such as I have described is due to the fact that the static position of the axle and spring changes whenever there is a change in the weight of the load in the vehicle. Consequently the point in the movement of the absorber where the resistance must be released is not fixed, but changes frequently.

This problem I have solved by using a piston in a cylinder, containing oil or other suitable liquid, either piston or cylinder being connected to the car body and the other to the axle, with ports so arranged that no resistance will be offered to the movement of the piston on the cylinder when the axle is moving away from its static position, but they will be closed and offer resistance to the piston when the axle is returning to its static position. To provide for the change in location of the static position the ports must be contained in or operated by a movable part connected to the piston by springs but with its free movement controlled by a dash pot so that the ports always tend to keep a fixed position with respect to the moving piston but can do so only when the piston is moving slowly, the action of the dash pot causing the ports to remain immovable and the springs to be stretched during the rapid movements of the piston.

For practical purposes I use intermediate the axles and the car body a recoil absorber comprising as its essential characteristics a cylindrical casing which is attached rigidly to the car body, within which is a substantially cylindrical rotary valve having two oppositely disposed ports. Cooperating with such valve is a rotary piston of peculiar shape connected to the car axle in the proper manner to secure its operation, preferably by means of a lever or arm secured to the axis of the piston, which passes through a stuffing box, and by a link to the axle bearing.

The cylindrical casing is divided into two parts by a cylindrical projection so that we have in effect two cylinders and two pistons.

The cylindrical valve is capable of rotation within the casing and is actuated by means of a spring connected with the piston, and these parts are so arranged that when the car is at rest, the spring is under substantially no tension, so that the said valve is moved to a position in which the edges of the ports are practically in line with the edges of the piston.

Through the body of the rotary piston are passages which are valve controlled, the valves being spring actuated and opening downwardly, whereby a liquid, such as oil, contained within the casing, will pass freely through such passages, but in one direction only.

In the device, as thus generally described, the piston oscillates rapidly in unison with the vertical movements of the car axle, and in so doing the springs connected therewith are alternately compressed and distended. This imparts a tendency for the rotary valve to move correspondingly, but its free movement is opposed by a suitable dash pot influence. As the piston moves away from its normal position the liquid passes freely through one valve controlled passage therein in one direction, and around the opposite end of the piston through the open valve port in the same rotary direction. Then, as the piston tends to return to its normal or static position, the said valve controlled passage is closed and the liquid at this end of the piston is under compression. At the other end of the piston the liquid flows freely through the open valve port and through the valve controlled passage in that end of the piston.

By this means, opposition to the return movement of the piston is created, and the contained liquid, if the valve ports be closed, will be forced through properly restricted passages provided therefor, and the recoil of the spring seated axle thus retarded. An initial movement of the piston in the opposite direction will manifestly have the same effect, the direction of flow of the liquid only being different.

This device in its complete form adapted for practical use is shown in the accompanying drawings, in which—

Fig. 3 is a vertical section of the device on a plane parallel with the axis.

Fig. 4 is a view of the interior mechanism of the device in elevation; and

Figs. 5, 6, 7 and 8 are diagrams illustrating the action of the same.

Figure 1:
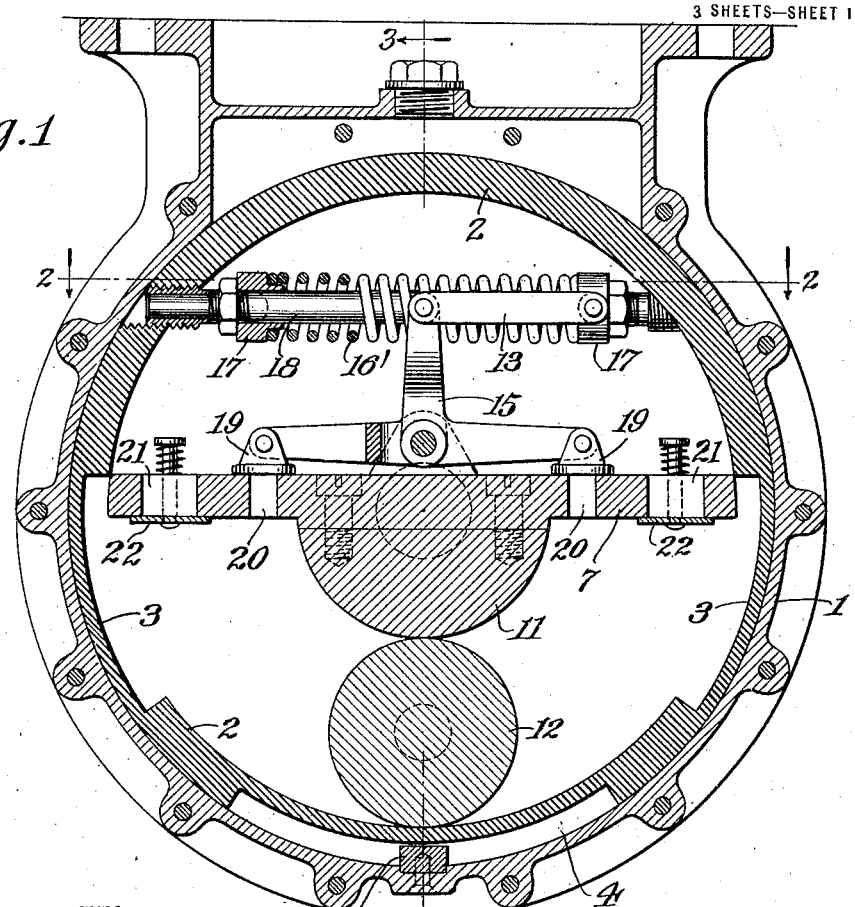
Fig. 1 is a vertical central section of the recoil absorber.
Figure 2:
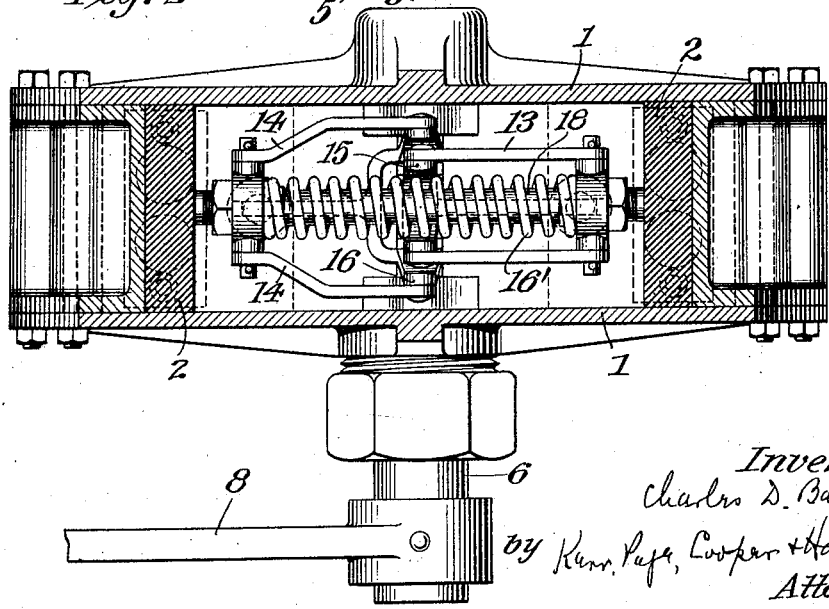
Fig. 2 is a horizontal section of the same, on line 2—2 of Fig. 1.

The operative parts of the device are contained within a cylindrical casing 1 which is adapted to be secured rigidly to the body of a car or other vehicle. The entire device is filled with oil or other suitable liquid which is prevented from escaping around the shaft of the piston by a suitable stuffing box. This casing contains a rotary cylindrical valve 2 having two recesses or ports 3, 3 and in order to impede its rotation it is provided with an external recess 4, designed to contain a liquid such as oil, and into which extends from the casing an abutment 5 which retards the flow of the oil between the two parts of the recess and thus retards the rotation of the valve 2.

Within this valve 2 is mounted on a central shaft 6 a flat piston 7, and said shaft is connected by an arm or lever 8 to a link 9 (see Fig. 5) which in turn is pivotally connected to a stud on the axle bearing 10. The space within the valve or beneath or on one side of the piston 7 should be divided into two compartments with restricted passages of communication between them, for which purpose I secure to the under side of the piston a rounded projection 11 and mount between this and the walls of valve 2 a cylinder 12, which is rigidly connected to the casing 1.

The valve 2 is designed to be controlled by a spring connection with the piston, and any proper means may be employed for this purpose. In the drawings I have shown two frames 13, 14, pivotally connected to bell crank levers 15, 16, pivoted to studs on the upper face of the piston, and said frames connect with the ends of a spiral spring 16 through collars 17, sliding on a round rod 18, the ends of which are connected with the valve 2 at opposite points. As the spring is compressed by one or the other frames 13 or 14, the valve tends to rotate but can do so only very slowly on account of the dash pot action of parts 4 and 5.

The horizontal ends of the bell crank levers 15 and 16 carry valves 19, which normally cover passages 20 through the piston, and the function of these valves is to prevent the pressure under the piston from exceeding a pressure which has a definite value with respect to that exerted by the spring 16, which is in direct relation to the displacement of the vehicle spring from its static position.

Through the piston 7 are also two passages 21 on opposite sides of the center which are closed by plate valves 22, spring controlled and adapted to open downward.

For a more detailed description of operation than that above given, reference is had to Figs. 5 to 8. Let it be assumed that the normal or static position of the axle is along the line C—C and that by some inequality in road surface the axle has dropped to the position shown in Fig. 5. In so doing it has rotated the piston 7, but this movement is not opposed, except slightly, as the liquid flows downward through the left hand plate valve and upward through the right hand valve port around the end of the piston.

Assume, however, that the axle then rises, carrying the piston back. The plate valve 22 on the left side of the piston is now closed by its spring and by the direction of flow of the liquid, and the return of the piston is opposed because the liquid under the left hand side of the valve can escape only through restricted passages. During this time the valve 2, although acted upon by the compression of the spring 16, has been held practically stationary by the dash pot parts 4 and 5, and when the piston reaches its normal position where the edge of the piston is in line with the edge of the port 3, the pressure is released.

Figs. 7 and 8 illustrate the conditions which arise when the axle rises above the line C—C, and require no explanation in view of the above.

In Figs. 5 to 8 we have not shown the movable feature of the valve 2 which permits it to adjust itself to the changes in the static position of the axle of the vehicle. When the axle moves up or down very slowly the dash pot action on the valve 2 is not noticeable and the valve then moves with the piston so that the edges of the piston stay in line with the edges of the ports 3. In this way the normal position of the piston is made to correspond to the normal or static position of the wheel axles.

So far as I am aware the functions of the device above described are new in the sense that the movement of the axles away from their static positions in either direction is never opposed by the action of the absorber but the return to the static position from either direction is always opposed.

What I claim is:

1. The combination with a spring supported vehicle body and the supporting axles, a recoil absorber intermediate the vehicle body and the supporting axles comprising a valve, a piston movable freely in both directions away from its normal position of rest, means controlled by such movements to retard or absorb its return or recoil movement in both directions, and means controlled by the static load upon said vehicle for causing said valves to follow the movements of said piston.

2. The combination with a spring supported vehicle of a recoil absorber intermediate the vehicle body and the supporting axles, comprising a movable valve, a piston movable freely in either direction from its normal position of rest, and a connection between the piston and valve whereby the latter may be moved by the movement of the piston to shift the position of its ports.

3. The combination with a spring supported vehicle of a recoil absorber intermediate the vehicle body and the supporting axles, comprising a movable valve, means for opposing its movement by dash pot action, a piston movable freely in either direction from its normal position of rest, and a connection between the piston and valve whereby the latter is moved by the movement of the piston to shift the position of its ports.

4. The combination in a spring supported vehicle of a recoil absorber intermediate the vehicle body and its axle, comprising a cylindrical casing, a rotary valve contained therein, a rotary piston connected with the vehicle axle, a spring connection between the piston and the rotary valve whereby the latter is rotated by the movement of the piston to thereby shift the position of its ports.

5. The combination with a cylindrical casing secured to a car body, of a cylindrical valve with oppositely disposed ports, contained therein, a rotary piston mounted in said valve and connected with the axle, spring controlled valves in said piston, and a spring connection between the piston and the valve whereby the valve is moved by the movement of the piston to shift its ports.

6. The combination with a cylindrical casing secured to a car body, of a cylindrical valve with oppositely disposed ports contained therein, a rotary piston mounted in said valve and connected with a car axle, spring controlled valves in said piston and a spring intermediate the piston and the cylindrical valve whereby the valve is rotated by the rotary movement of the piston.

7. The combination with a cylindrical casing attached to a car body, of a cylindrical valve working therein and adapted to contain a liquid such as oil, a rotary piston mounted in said valve and connected with a car axle so as to be rotated by the vertical movements of the same, spring controlled valves in said piston, a spring intermediate the piston and the cylindrical valve whereby the movements of the piston produce a rotation of the valve, said cylindrical valve having recesses which constitute ports and which are shifted by its movement.

8. The combination with a cylindrical casing attached to a car body, of a cylindrical valve working therein, and having recesses therein which constitute ports, said valve containing a liquid such as oil, a recess in the outer periphery of the valve working over a stud in the casing to constitute a dash pot, a rotary piston mounted in said valve and connected with an axle so as to be rotated by the vertical movements of the same, spring controlled valves in said piston, a spiral spring intermediate the piston and the cylindrical valve whereby the movements of the piston produce a rotation of the valve.

9. The combination with a spring supported vehicle of a recoil absorber, intermediate the vehicle body and the supporting axles comprising a casing containing a liquid, a piston moving therein, a movable valve containing ports whereby the piston is able to move freely in either direction from its normal position, but is opposed when returning, a spring connection between piston and valve whereby the valve tends to move with the piston and a means for opposing the movement of the valve by dash pot action so that the normal position of the ports and piston correspond to the normal position of rest of the axle of the supporting vehicle.

10. The combination with a spring supported vehicle of a recoil absorber intermediate the vehicle body and a supporting axle, comprising means for retarding relative movement of said body and axle when moving toward normal position in either of opposite directions but imposing substantially no retardation to relative movement of said body and axle away from normal position, and means controlled by the static load upon said vehicle for preventing retardation of relative movement of said body and axle away from normal position when the normal distance between said body and axle has changed.

In testimony whereof I hereunto affix my signature.

CHARLES D. BARRETT.